July 31, 1951 L. U. PICARD 2,562,241

NAVIGATIONAL INSTRUMENT

Filed Aug. 2, 1948

INVENTOR.
Leo U. Picard
BY
Attorney.

Patented July 31, 1951

2,562,241

UNITED STATES PATENT OFFICE 2,562,241

NAVIGATIONAL INSTRUMENT

Leo U. Picard, St. Joseph, Mich.

Application August 2, 1948, Serial No. 41,959

2 Claims. (Cl. 33—72)

This invention relates to improvements in a navigational instrument.

The principal objects of this invention are:

First to provide a simple, inexpensive instrument for rapidly determining relative angular bearing and range of objects in relation to the observer.

Second, to provide an instrument for rapidly calculating the range of an object from the observer without resorting to triangulation or mathematical tables.

Third, to provide a simple instrument by means of which a person can easily determine the approximate range of an object of known dimension.

Other objects and advantages of my instrument will be apparent from a consideration of the following descriptions and the attached drawings. The invention is further pointed out in the claims:

The drawings of which there is one sheet, illustrate a preferred form of my navigation instrument and two examples of the use thereof in determining the range of distant objects.

My instrument consists of a sight bar 1 which is preferably made of transparent material such as a clear thermoplastic. Projecting normally from the sight bar 1 is a rod or bar 2 which supports an eye piece 3 in spaced relationship to sight bar 1. The eye piece 3 defines a viewing slot 4 and the sides of the slot 4 are preferably beveled forwardly and blackened as at 5 to permit wide angle vision through the slot without reflecting glare into the eye of the observer.

Figure 1:
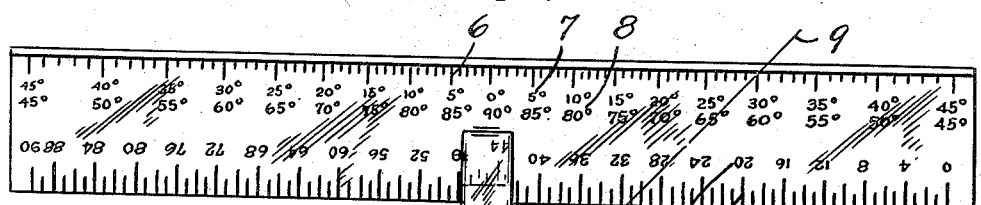
Fig. 1 is an oblique view of my instrument.
Figure 2:
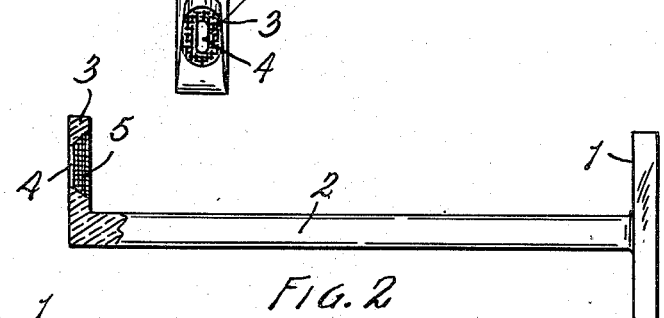
Fig. 2 is a side elevational view of the instrument partially broken away in cross section.

The upper edge of the sight bar 1 is provided with a series of graduations or angular indicia as at 6, the graduations increasing in size or length from a center point immediately in front of the eye piece 3 to a maximum at each end of the sight bar. The graduations are arranged to indicate the angular deviation of the line of sight through the sight slot 4 from the center of the sight bar. The graduations 6 are calibrated with a numerical indicia scale 7 reading directly from the center point of the scale and the graduations are also desirably provided with an inverse numerical scale 8 for reading the complementary angle or bearing of an object directly from the scale. Thus an observer sighting through the eye slot 4 at a distant object as indicated by the line of sight 9 in Fig. 1 could immediately determine that the object was 30 degrees to the left of a line parallel to the sight bar.

The angle bearing feature of my instrument is particularly useful in marine navigation where the navigator has at his disposal a window facing directly forwardly in the vessel and a window facing directly abeam of the vessel as is the case in most pilot houses. By placing the sight bar against either of these windows and sighting through the eye piece 3 the navigator can immediately determine the angular bearing of an object such as another ship or a navigational hazard with respect to the travel of his own ship. The direct and inverse scales on the sight bar permit the navigator to immediately read the bearing in terms of the heading of the ship or in terms of the angle off the beam of the ship.

Figure 3:
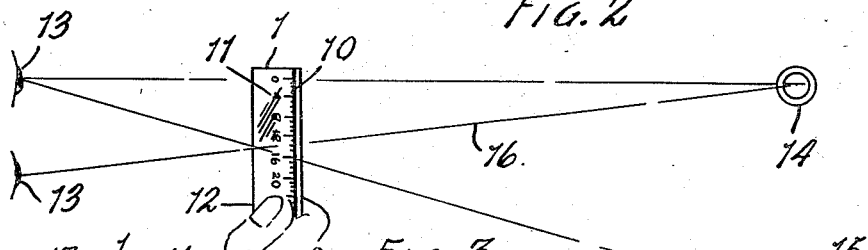
Fig. 3 is a conventional view illustrating one method of determining range with the instrument.

The bottom edge of the sight bar 1 is provided with a series of equally spaced graduations 10, the graduations being numbered with scale indicia as at 11 for convenience in reading the scale. The spacing of the graduations 10 can be of any convenient length and I have found that a space of between one-eighth and three-eighths of an inch proves very satisfactory. The scale graduations 10 are used to determine the approximate range of a distant object in a manner which I will now described:

Fig. 3 illustrates one method of determining the range of an object by use of the scale 10. The navigator holds the sight bar at arms length as at 12 and sights with his left eye indicated at 13 across the zero mark of the scale to the left object 14 of two fixed points, the space between which is known to the navigator. These objects can be the entrance markers to a harbor as indicated at 14 and 15 or can be the ends of a ship of known length or any prominent features on shore, the distance between which is known. The distance between harbor entrance markers and the length of most vessels is published in navigational literature and is readily available to all navigators and in sailing over a common route, each navigator will become familiar with the spacing or dimension of a large number of objects so that he will not have to look up the spacing each time he uses the instrument.

The observer next sights with his left eye to the right end of the object indicated at 15 and notes the number of marks or scale graduations between the two lines of sight which reading is indicated as 16 marks in Fig. 3. Having determined this reading and while still holding the sight bar in the same position the observer next closes the left eye and sights with the right eye to the first point of observation as indicated by the line of sight 16 in Fig. 3. The navigator notes the number of marks on the scale corresponding to the line of sight 16 which in the example illustrated is 14 marks.

In order to determine the range of the object, the navigator first divides the second reading which in this case is 14 by the first reading of 16 to arrive at a figure of .875. This figure is multiplied by a fixed factor of 10 and then multiplied by the known spacing between the two objects sighted at. Assuming that the objects 14 and 15 are known to be 50 feet apart, the observer will note that objects 14 and 15 in the example illustrated will be 437.5 feet away.

Figure 4:
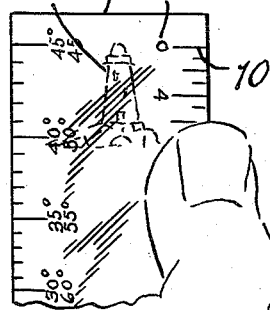
Figs. 4 and 5 are conventional views illustrating a second method of determining range with the instrument.
Figure 5:
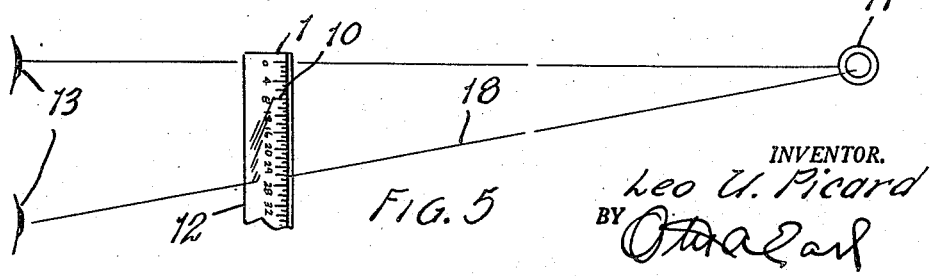

The lower or range scale on the instrument can be conveniently used in determining the range of objects having a known vertical height. Figs. 4 and 5 illustrate the method of determining this range. As illustrated in Fig. 4 the navigator holds the sight bar at arms length and sights through it to an object such as the light house 17 of known height and determines the number of marks or scale graduations covering the height of the object. In the example illustrated, the first reading is 6 marks. The navigator then holds the sight bar horizontally and at arms length and sights with his left eye over the zero mark of the scale to the same object 17. Then without moving the sight bar he sights with his right eye to the object as indicated by the line of sight 18 and notes the number of marks indicated on the scale which in this case is 26. The two readings 6 and 26 are then used in the same formula described in connection with Fig. 3. The second reading of 26 is divided by the first reading of 6 and multiplied by the permanent factor 10 to arrive at the figure 43.3. This figure is then multiplied by the known height of the light house and assuming that the light house is 48 feet high, the range to the light house will be 2,078 feet. In each method of determining range, the first reading is the number of marks subtended on the scale by sighting at both ends of an object of known dimension. The second reading is the number of marks read with the right eye while holding the zero mark alined with the left eye.

The examples of range finding just described are actual examples of observations I have made and checked with the actual range determined by more precise and time consuming methods. The range figures obtained by use of my instrument have proved to be accurate within 5% of the actual range to the object. The accuracy of the measurements with my instrument is entirely satisfactory in most cases for navigating ships of various sizes and the speed with which the range can be determined makes my instrument very desirable since it is often more important to obtain a quick relatively accurate reading than to obtain a more accurate reading which requires considerably longer time. With a little practice the user can learn to estimate and allow for the error of various readings.

By the use of my instrument a navigator can rapidly obtain the angular bearing of an object such as other ships or a harbor entrance and then immediately obtain a close approximation of the range to the object. Knowing these figures the navigator is better able to safely navigate his ship relative to the distant object. My instrument is also useful to marine contractors and fishermen in locating dredging or fishing grounds and can be used by sportsmen to determine their favorite fishing spot on small lakes.

I have thus described a highly practical form of my instrument so that others can reproduce and use the same without further disclosure.

Having thus described my invention, what I claim as new and desire to secure by Letters Patent, is:

1. A navigational instrument comprising, a sight bar having angular scale graduations along one edge thereof and a range sighting scale of equal graduations along the opposite edge thereof and being straight and unobstructed from end to end on its back side opposite from said graduations, a rod fixedly projecting normally from the center of said sight bar, and an eye piece carried on the opposite end of said rod from said sight bar, said eye piece defining a sight opening for viewing said angular scale graduations, said angular scale having direct reading numerical indicia associated therewith and increasing from zero on each side of a center line normal to said bar through said eye piece and inverse numerical indicia for reading the complementary angles of the direct reading indicia.

2. A navigational instrument comprising, a sight bar having angular scale graduations along one edge thereof and being straight and unobstructed from end to end on its back side opposite from said graduations, a rod fixedly projecting from said sight bar, and an eye piece carried on the opposite end of said rod from said sight bar, said eye piece defining a sight opening for viewing said angular scale graduations, said angular scale having direct reading numerical indicia associated therewith and increasing from zero on each side of a line normal to said bar through said eye piece and inverse numerical indicia for reading the complementary angles of the direct reading indicia.

LEO U. PICARD.

REFERENCES CITED

The following references are of record in the file of this patent:

UNITED STATES PATENTS

| Number | Name | Date |
|---|---|---|
| 129,311 | Biggs | July 16, 1872 |
| 521,597 | Altpeter | June 19, 1894 |
| 1,723,456 | Zak | Aug. 6, 1929 |
| 2,334,739 | Zak | Nov. 23, 1943 |

FOREIGN PATENTS

| Number | Country | Date |
|---|---|---|
| 79,570 | Sweden | Feb. 13, 1934 |
| 433,324 | Great Britain | Aug. 13, 1935 |